United States Patent
Blasl et al.

(10) Patent No.: US 11,722,297 B2
(45) Date of Patent: Aug. 8, 2023

(54) DEVICE AND METHOD FOR GENERATING A KEY

(71) Applicant: Fraunhofer-Gesellschaft zur Foerderung der angewandten Forschung e.V., Munich (DE)

(72) Inventors: Martin Blasl, Dresden (DE); Florenta Costache, Dresden (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 748 days.

(21) Appl. No.: 16/805,010

(22) Filed: Feb. 28, 2020

(65) Prior Publication Data
US 2020/0201134 A1 Jun. 25, 2020

Related U.S. Application Data

(63) Continuation of application No. PCT/EP2017/072241, filed on Sep. 5, 2017.

(51) Int. Cl.
G02F 1/21 (2006.01)
G02F 1/19 (2019.01)
H04L 9/08 (2006.01)

(52) U.S. Cl.
CPC ............ H04L 9/0861 (2013.01); *G02F 1/217* (2021.01); *G02F 2201/122* (2013.01)

(58) Field of Classification Search
CPC .................................................. H04L 9/0861
USPC .......................................................... 380/44
See application file for complete search history.

(56) References Cited

U.S. PATENT DOCUMENTS

| 10,571,335 B2 * | 2/2020 | Hu .............................. G01J 3/12 |
| 2008/0149866 A1 | 6/2008 | Deshazer et al. |
| 2018/0196137 A1 * | 7/2018 | Lee ........................ G01S 7/4817 |

FOREIGN PATENT DOCUMENTS

| CN | 102427439 A | 4/2012 | |
| CN | 112166464 A | 1/2021 | |
| GB | 201414446 | 10/2014 | |
| GB | 2529228 A * | 2/2016 | ............ G06F 7/588 |
| GB | 2529228 A | 2/2016 | |
| GB | 201706216 | 5/2017 | |
| GB | 2561590 A | 10/2018 | |

(Continued)

OTHER PUBLICATIONS

Kravtsov, K S, "Physical layer secret key generation for fiber-optical networks", Optics Express, 2013-10, Oct. 2013, pp. 1-17.

*Primary Examiner* — Kambiz Zand
*Assistant Examiner* — Phuc Pham
(74) *Attorney, Agent, or Firm* — Perkins Coie LLP; Michael A. Glenn

(57) ABSTRACT

A device for generating a key has a multimode interferometer which can be coupled to a light source and has a light path having an electro-optical material, the light path being configured to obtain light at an input side, influence the light under the influence of a locally varying refraction index of the electro-optical material and provide influenced light at an output side. The device has a receiver configured to receive the influenced light at the output side, and has an evaluator configured to perform an evaluation based on the influenced light and to generate the key based on the evaluation.

25 Claims, 14 Drawing Sheets

(56) References Cited

FOREIGN PATENT DOCUMENTS

WO         2019231655 A1    12/2019
WO    WO-2019231655 A1 * 12/2019   ............... G09C 1/00

\* cited by examiner

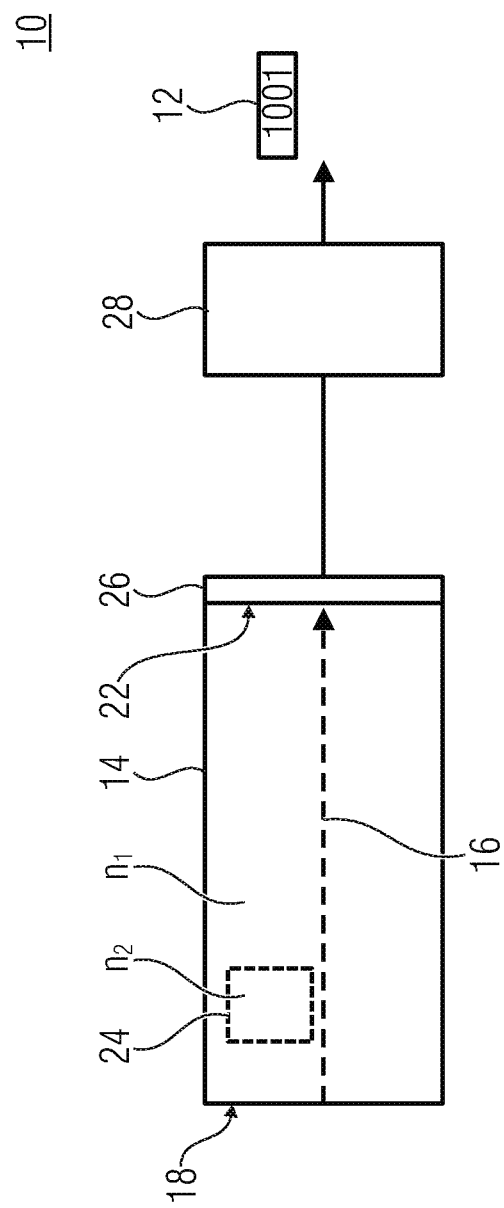

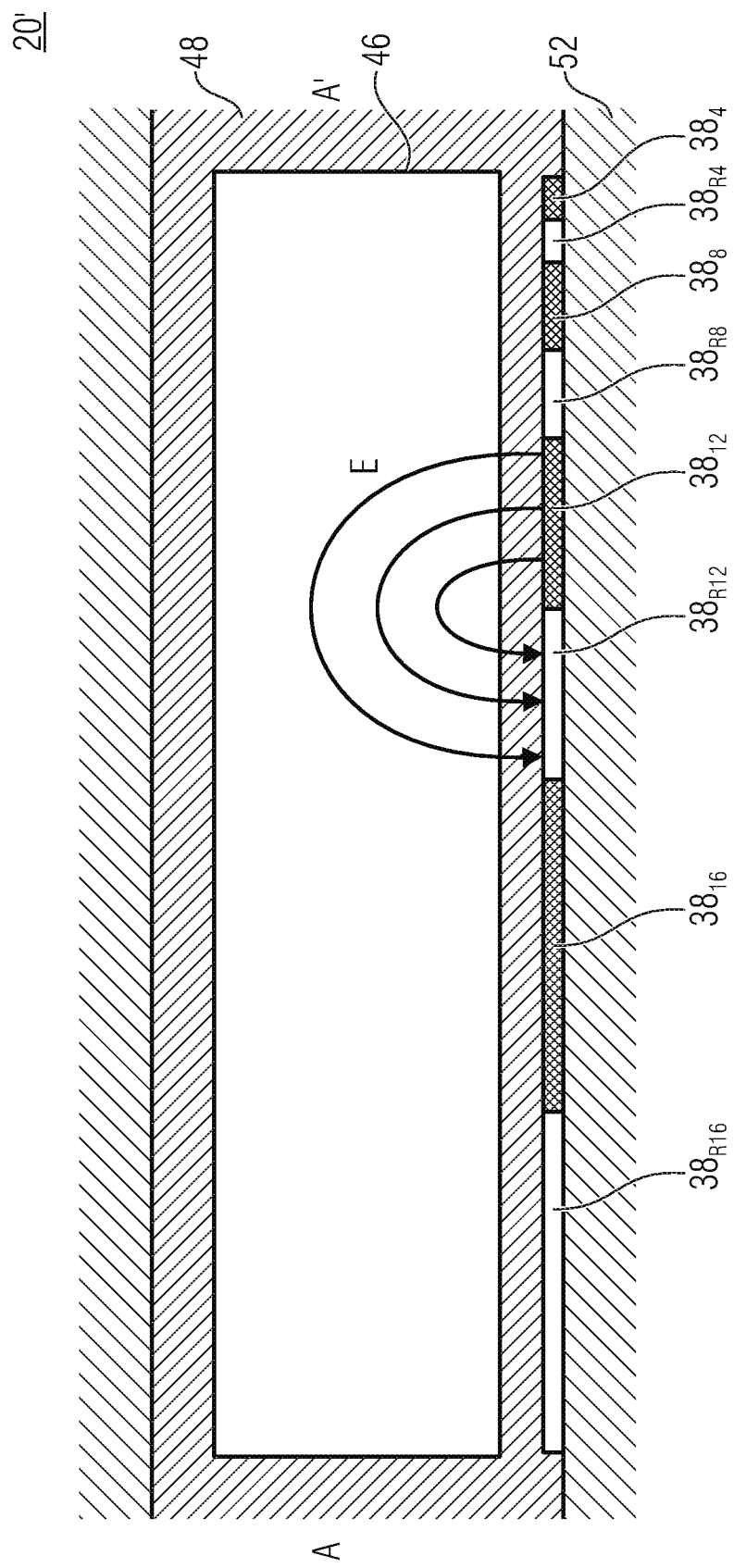

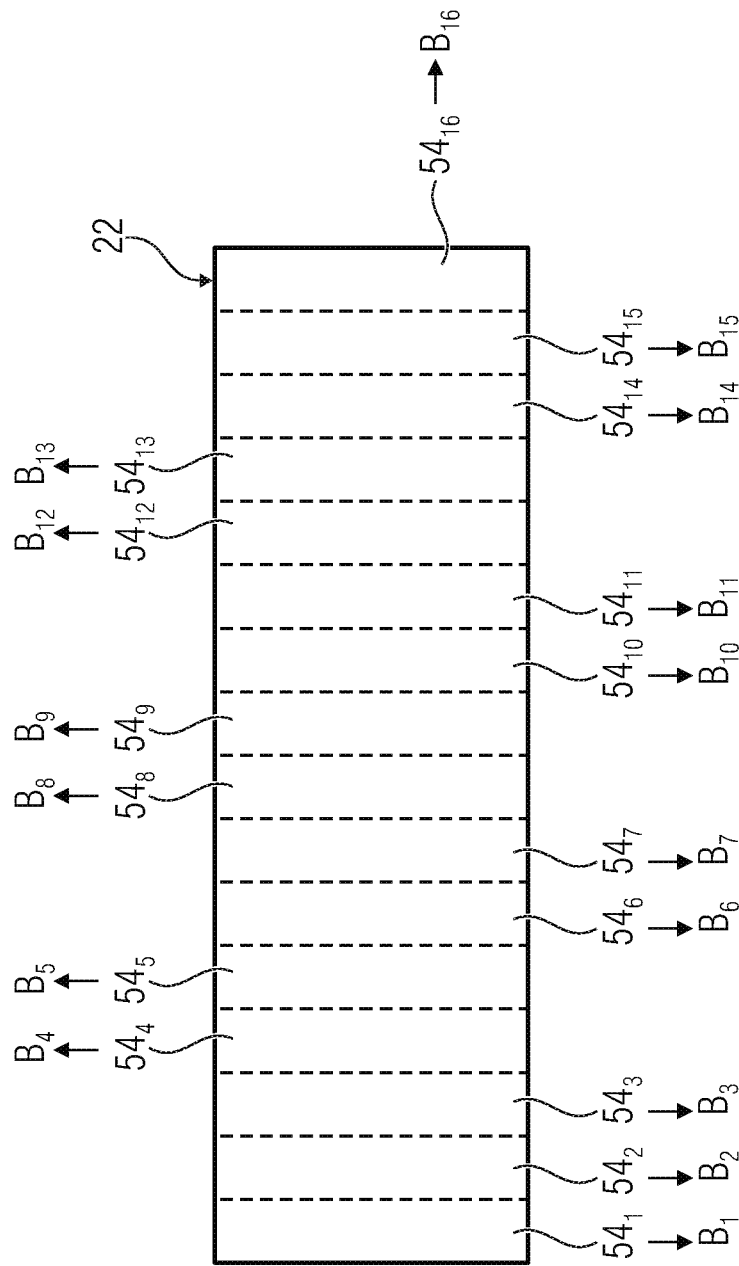

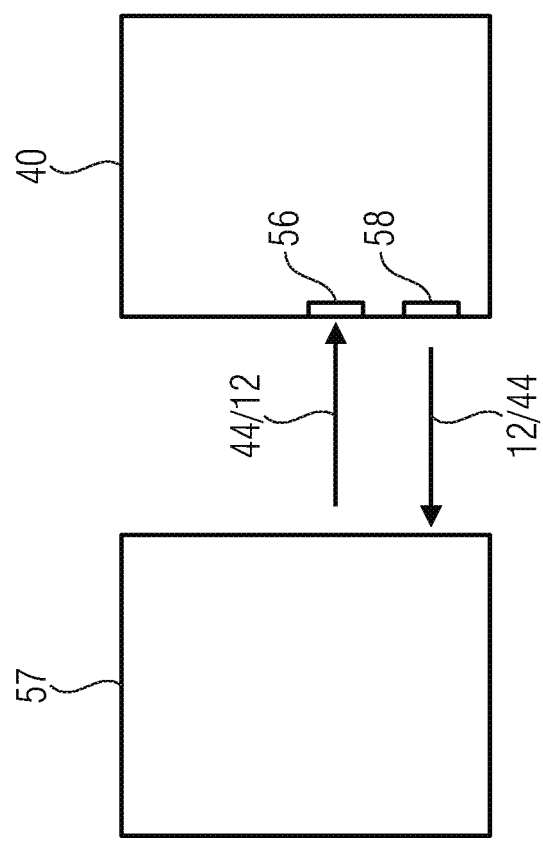

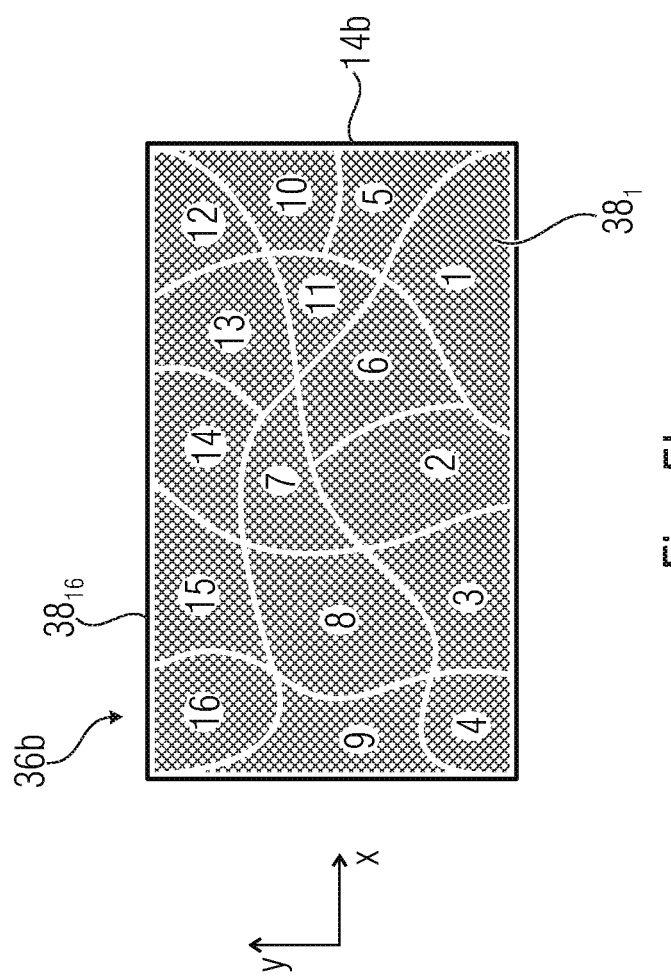

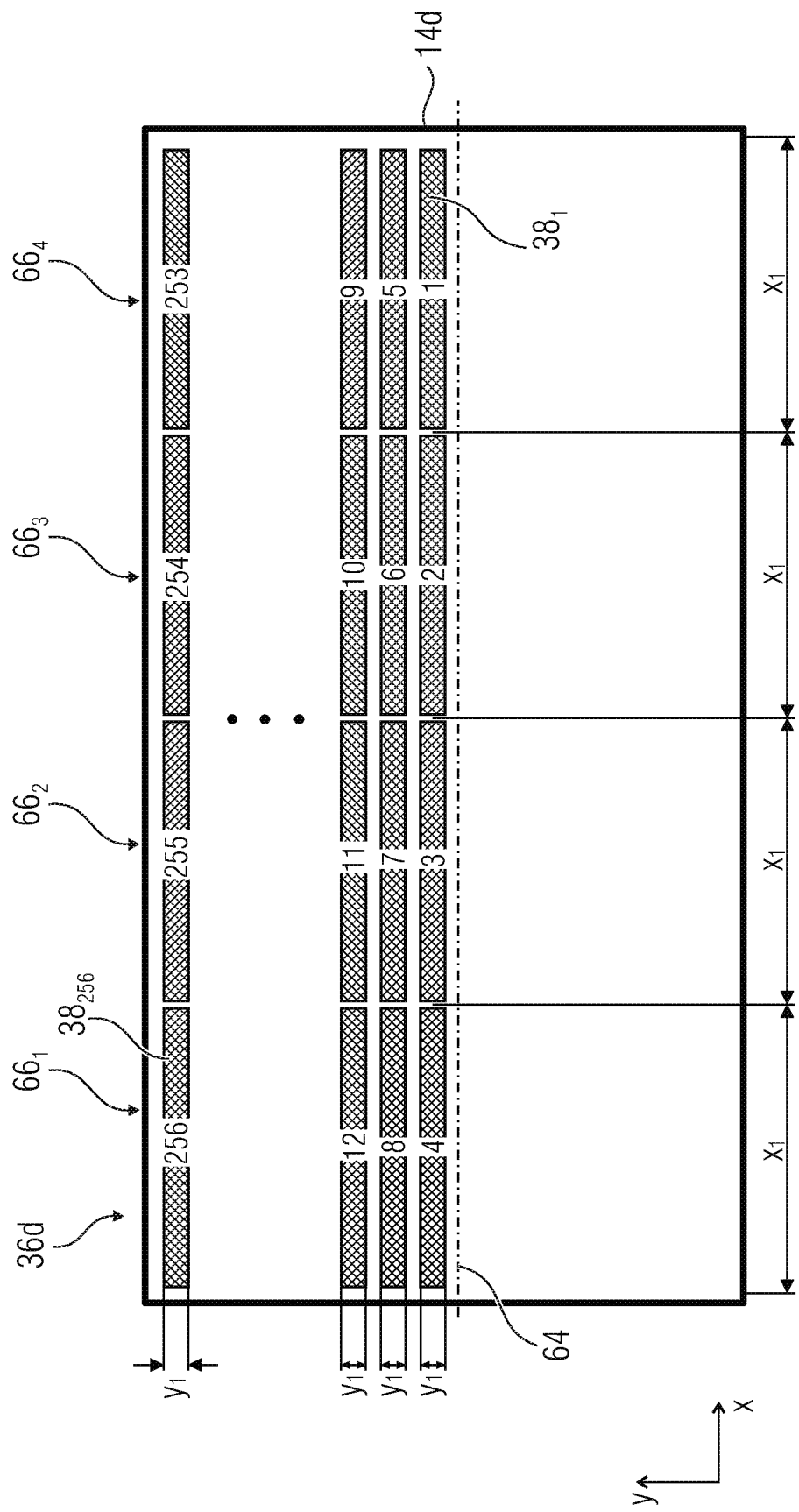

DEVICE AND METHOD FOR GENERATING A KEY

CROSS-REFERENCE TO RELATED APPLICATION

This application is a continuation of copending International Application No. PCT/EP2017/072241, filed Sep. 5, 2017, which is incorporated herein by reference in its entirety.

BACKGROUND OF THE INVENTION

The present invention relates to a device for generating a key, like a bit sequence, using a multimode interferometer. The present invention also relates to a method for providing a key and to a cryptographic multimode interferometer or electro-optically programmable multimode interferometer as a cryptographic key.

There is demand for concepts for deriving keys for the purpose of authentication and/or encryption. Passwords or other shared secrets may, for example, be used, which allow determining whether the respective communication partner is in possession of the knowledge entailed.

Well-known software or hardware-based algorithms for performing an encryption can only be mapped insufficiently, i.e. with insufficient precision and/or with too high computing complexity.

Thus, a concept for generating a key which can generate the key with high precision and low computing complexity would be desirable.

SUMMARY

According to an embodiment, a device for generating a key may have: a multimode interferometer which can be coupled to a light source and has a light path having a material having a controllable refraction index, the light path being configured to obtain light at an input side and influence the light under the influence of a locally varying refraction index of the material in order to provide influenced light at an output side; receiving means configured to receive the influenced light at the output side; and evaluating means configured to perform an evaluation based on the influenced light and to generate the key based on the evaluation; an electrode arrangement configured to generate the locally varying refraction index based on locally varying electrical fields of the electrode arrangement; wherein the receiving means has an array of photodetectors and the evaluating means is configured to perform, for each of the photodetectors, a threshold value decision as to whether the quantity detected in the respective photodetector is to be transferred to a binary 0 or a binary 1 and to obtain a bit sequence as the key by lining up the threshold value decisions.

According to another embodiment, a method for generating a key may have the steps of: guiding light from an input side of a light path to an output side of the light path under the influence of a locally varying refraction index of a material of the light path, the material having a controllable refraction index; generating the locally varying refraction index by an electrode arrangement based on locally varying electrical fields of the electrode arrangement; providing influenced light at the output side; receiving the influenced light at the output side by receiving means which has an array of photodetectors; performing an evaluation based on the influenced light by performing a threshold value decision, for each of the photodetectors, as to whether a quantity detected in the respective photodetector is to be transferred to a binary 0 or a binary 1; and generating the key based on the evaluation by lining up the threshold value decisions.

One finding of the present invention is having recognized that, by using a multimode interferometer, a key can be generated on a hardware basis, i.e. at low computing complexity, which can be obtained by making use of the optical characteristics of a multimode interferometer with high precision.

In accordance with an embodiment, a device for generating a key comprises a multimode interferometer which can be coupled to a light source and comprises a light path having a material comprising a controllable refraction index, the light path being configured to obtain light at an input side under the influence of a locally varying refraction index of the material, to influence the same and to provide influenced light at an output side. In addition, the device comprises receiving means configured to receive the influenced light at the output side, and evaluating means configured to perform an evaluation based on the influenced light and to generate the key based on the evaluation.

In accordance with an embodiment, the device is configured to obtain a locally varying influence of light based on the locally varying refraction index. This allows obtaining the key by the local variation of the refraction index within the material, obtainable at low computing complexity and high precision.

In accordance with an embodiment, the device comprises a light source connected to the light path and configured to emit the light. This allows obtaining a functionally integrated circuit where light source and material are mutually matched.

In accordance with an embodiment, the light source is a narrow-band light source, like laser or a light source having a filter, which may receive broad-band light and output a narrow-band portion.

In accordance with an embodiment, the receiving means comprises a filter configured to filter the influenced light and to provide narrow-band filtered light at a filter output, the evaluating means being configured to perform the evaluation based on the narrow-band filtered light. This allows using comparably broad-band light sources, allowing a simple technical design, and filtering the light used at the receiving means so that keys having an unchanged high precision can be obtained with an unchanged high precision.

In accordance with an embodiment, the evaluating means is configured to determine a local intensity distribution of the influenced light or filtered light and to generate the key based on the local intensity distribution. It is of advantage here that an intensity distribution can be determined at low computing complexity, like using threshold values.

In accordance with an embodiment, the evaluating means is configured to perform the local intensity distributions in mutually different sub-regions of a total region of the light path. The key comprises a plurality of key portions, wherein each key portion is associated to a sub-region. This allows obtaining complex keys at low a complexity of the system.

In accordance with an embodiment, the device comprises an electrode arrangement configured to generate the locally varying refraction index of the material based on locally varying electrical fields of the electrode arrangement. The electrode arrangement may be part of the multimode interferometer. It is of advantage here that electrical fields can be generated with high precision, high reproducibility and low technical complexity.

In accordance with an embodiment, the electrode means comprises a number of spatially separate, i.e. mutually insulated, electrode elements configured to influence the refraction index of the material in a spatially separate manner. The device comprises driving means configured to drive the electrode elements such that a pattern in the influenced light is unambiguously associated to each pattern of driven electrodes of the electrode means. It is of advantage that a drive signal for driving the electrodes can be unambiguously transferred to a pattern of the influenced light.

In accordance with an embodiment, the electrode means comprises a plurality of spatially separate electrode elements arranged in a two-dimensional array. With regard to the influence of light guided through the light path, the electrodes are formed to be asymmetrical relative to at least one direction of the two-dimensional array. This can be done to an extent such that each electrode generates an unambiguous influence in the influenced light, and/or that each combination of electrode elements driven produces an unambiguous pattern. It is of advantage here that high an entropy can be obtained in the key and a high range of values of the key is obtained.

In accordance with an embodiment, the device is configured to generate an asymmetrical influence of the light guided through the light path relative to at least one direction of the two-dimensional array by mutually different electrode geometries and/or by mutually different electrical voltages at the electrode elements. This allows driving the electrodes at low complexity, like by pre-configured electrode geometries and/or applying constant and mutually different or varying voltages, which is simple as far as computing is concerned.

In accordance with an embodiment, the electrode means comprises a plurality of spatially separate electrode elements arranged in rows and columns of a two-dimensional array. Electrodes within a row comprise a mutually different dimension, unambiguous within the row, along a row direction. Alternatively or additionally, electrodes within a column comprise a mutually different dimension, unambiguous within the column, along a column direction. These criteria may apply to one, several or all the rows and/or columns. It is of advantage here that a compact arrangement of electrode geometries can be obtained.

In accordance with an embodiment, a quotient of the dimension of any two adjacent electrodes along the row direction comprises a uniform quotient value and/or a quotient of the dimension of any two electrodes along the column direction comprises the uniform quotient value. This allows easily obtaining individual electrode elements.

In accordance with an embodiment, the quotient value comprises a value within a range of values of at least 1.5 and at most 10, like a value of at least 2, like 2. A neighboring electrode along the column direction or row direction exemplarily comprises half a dimension when compared to the other electrode. Such a quotient value is of particular advantage for designing the individual electrode elements.

In accordance with an embodiment, the multimode interferometer is configured to vary the refraction index of the material in a locally varying manner based on a bit sequence comprising a first number of bits. The evaluating means is configured to provide, for the key, a bit sequence having the first number of bits for the key. This allows obtaining an n-bit key based on an n-bit driving of the multimode interferometer.

In accordance with an embodiment, the device is configured to provide the bit sequence at a signal output and to receive, at a signal input, an input signal which comprises a reference key, the device being configured to compare the reference key to the key and to evaluate an identity of a transmitter of the input signal based on a result of the comparison. This allows checking whether the other device knows the shared secret. Alternatively or additionally, the device can be configured to derive the key based on a bit sequence obtained and to provide the key so that the device receiving the key can check the identity of the device.

In accordance with an embodiment, the key is a first key. The device is configured to guide first light through the light path during a first time interval in order to obtain the first key, and to guide second light through the light path during a second time interval in order to obtain a second key. The evaluating means is configured to combine the first key and the second key to form a total key. This allows synergetically repeatedly using the multimode interferometer which, in interaction with different light, like light of different wavelengths, can excite different modes or propagate in different modes and thus generate different patterns in the influenced light so that the type of light or light source used is another degree of freedom which can be used to increase the bits used or generated in the key while maintaining the high entropy.

In accordance with an embodiment, the multimode interferometer is a first multimode interferometer. The device comprises at least a second multimode interferometer which is coupled to an output of the light path. This allows further influencing the already influenced light in the second multimode interferometer, allowing high robustness of the key generated.

In accordance with an embodiment, the device comprises at least a third multimode interferometer which is coupled to the output of the light path in parallel to the second multimode interferometer and is configured to obtain a local intensity distribution of the light path which differs from the first multimode interferometer. This means that the output of the first multimode interferometer can be divided into at least two further multimode interferometers which obtain information which is at least partly disjunctive from one another and continue to influence the same. This allows a further increased robustness of the key generated based on the outputs of the second and the third multimode interferometer.

In accordance with an embodiment, the multimode interferometer is a first multimode interferometer which is arranged to be interleaved with a second multimode interferometer. This allows high complexity of the key generated and, thus, high robustness of the key generated.

In accordance with an embodiment, the light path is a first light path and comprises at least two spatially spaced apart outputs of the light path which are configured to output different spatial intensity distributions of the light path. The spatially spaced apart outputs are coupled to an input of a second light path of the second multimode interferometer at different lateral positions. This means that the light path of the second multimode interferometer can obtain light which is influenced differently at laterally different positions so that light, which is influenced to a highly complex degree, can be obtained at the output of the second multimode interferometer, thereby allowing a robust key.

In accordance with an embodiment, the material is at least one of an electro-optical material, a magneto-optical material, a thermos-optical material and a voltage-optical material.

In accordance with an embodiment, the material is an electro-optical material and comprises at least one of beta barium borate, lithium niobate, lead lanthanium zirconate titanate, and a liquid crystal and a nitrobenzene material, which may provide a liquid having a marked Kerr effect. These materials allow precise driving with little aging effects and high precision.

In accordance with an embodiment, a method for generating a key comprises guiding light from an input side of a light path to an output side of the light path while influencing a locally varying refraction index of a material, having a controllable refraction index, of the light path. The method comprises providing influenced light at the output side and receiving the influenced light at the output side. Additionally, the method comprises performing an evaluation based on the influenced light and generating the key based on the evaluation.

BRIEF DESCRIPTION OF THE DRAWINGS

Embodiments of the present invention will be detailed subsequently referring to the appended drawings, in which:

FIG. 1 is a schematic block diagram of a device for generating a key in accordance with an embodiment;

FIG. 2b is a schematic sectional side view of the device of FIG. 2a along a section of a sectional line illustrated in FIG. 2a;

FIG. 2c is a schematic sectional side view of a device modified when compared to FIG. 2b where electrodes and counter electrodes are arranged on the same side of an optical core, in accordance with an embodiment;

FIG. 3 is a schematic illustration of an output side of a device in accordance with an embodiment, subdivided into different sub-regions;

FIG. 4 is a schematic block diagram of a device in accordance with an embodiment, which communicates with a further device;

FIGS. 5a-d are schematic top views of electrode arrangements of multimode interferometers which can be used in devices in accordance with embodiments;

DETAILED DESCRIPTION OF THE INVENTION

Figure 2A:
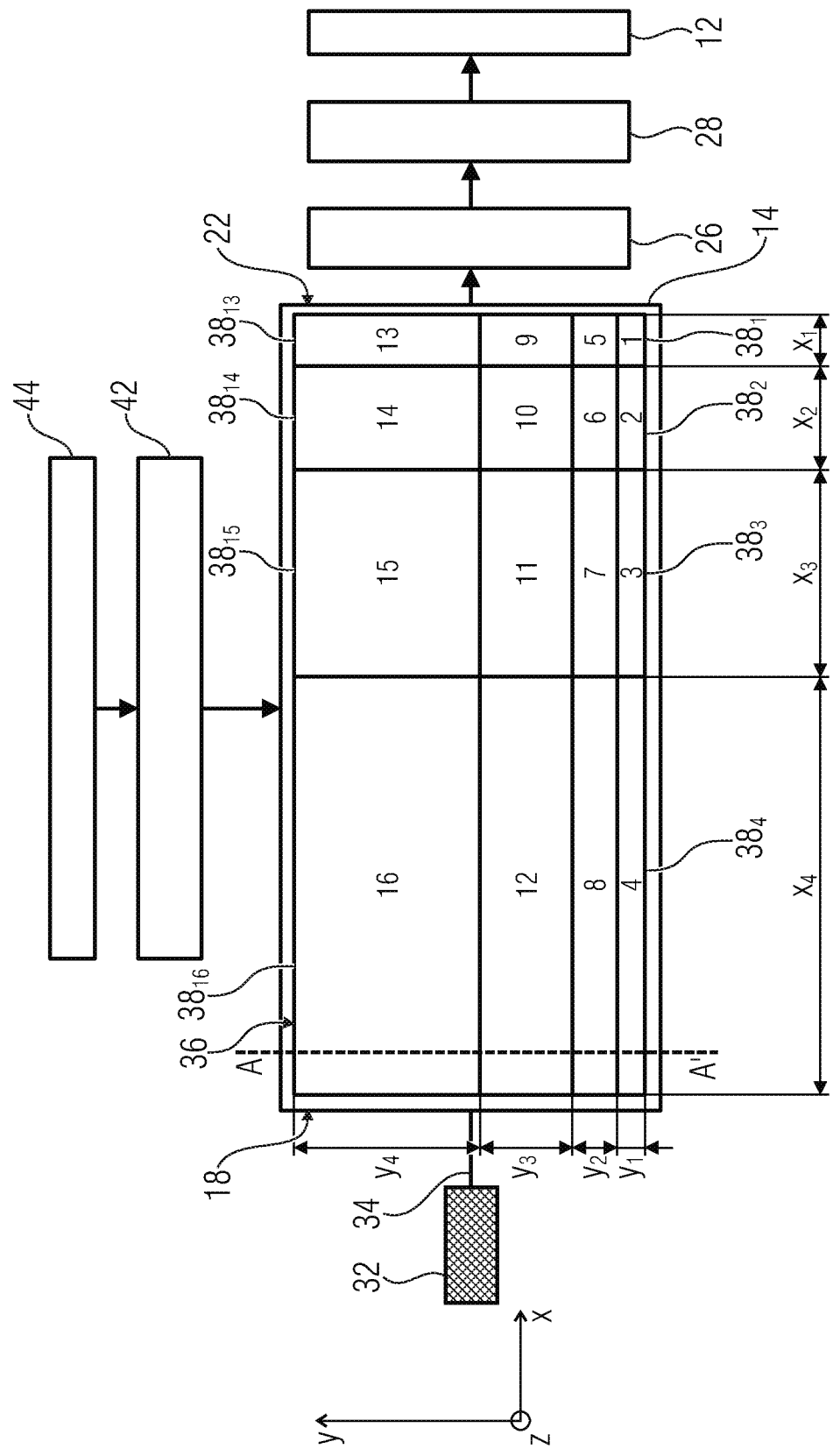
FIG. 2a is a schematic top view of a device in accordance with an embodiment which comprises a light source connected to a light guide.

Before discussing below in greater detail embodiments of the present invention referring to the drawings, it is to be pointed out that identical elements, objects and/or structures or those of equal function or equal effect are provided with equal reference numerals in the different figures so that the description of these elements illustrated in different embodiments is mutually exchangeable or mutually applicable.

The following embodiments refer to a device comprising a multimode interferometer. A multimode interferometer can be configured to guide light from an input side to an output side of a light path. Within the light path, the light can propagate in several modes which each cause the light to be influenced. This influence can be determined by a variable amplitude, phase or intensity distribution at the output side of the light path.

The following embodiments are discussed in connection with an electro-optical material which may comprise a locally varying optical refraction index depending on an electrical field. Although the embodiments are discussed in connection with an electro-optical material, embodiments are not restricted to this, but also relate to different materials the refraction indices of which vary. Magneto-optical materials for making use of a magneto-optical effect based on a magnetic field, thermo-optical materials for making use of a thermo-optical effect based on a variable temperature and/or a voltage-optical material for making use of a voltage-optical effect based on an electrical voltage are among these. Alternative or additionally, multi-quantum-well structures can be used which are produced by GaAs/AlGaAs semiconductors, for example.

In order to influence the different modes in the, for example, electro-optical material, a locally varying change in the refraction index of the electro-optical material can be made use of. Embodiments provide for applying electrical fields at different positions in the electro-optical materials in order to influence, i.e. change, the refraction index of the electro-optical material at the position of the electrical field. A spatial defect in the electro-optical material can be obtained by the varied refraction index, which allows a characteristic influence of the corresponding mode. The mode here can be influenced by a wavelength of light propagating through the light path, a position and/or a spatial extension of the defect. This means that the influence of the modes can be dependent on the wavelength of the light.

FIG. 1 shows a schematic block diagram of a device 10 for generating a key 12 in accordance with an embodiment. The device 10 comprises a multimode interferometer 14 which may be coupled to a light source. Exemplarily, the multimode interferometer 14 comprises a light path 16 through which light can migrate or is guided and can be influenced. A light source or a light guide connected to the light source can be coupled or connected at an input side 18 in order to obtain light. The light path 16 can comprise different refraction indices $n_1$ and $n_2$ at different positions in its course from the input side towards an output side 22, wherein there may be any number, position and/or geometry of regions 24 which comprise a different refraction index $n_2$ when compared to other regions. In particular, more than 2 mutually different refraction indices $n_1$ or $n_2$ can be implemented in the multimode interferometer 14. This means that there may be more than two different regions having different refraction indices.

An electro-optical material configured to change its refraction index responsive to an electrical field applied can be arranged in the light path 16. Examples of such an electro-optical material are beta barium borate, lithium niobate, lead lanthanium zirconate titanate, nematic liquid crystals and/or para-nematic liquid crystals. Alternatively, different materials can be used, the refraction index of which can be varied, like materials for making use of a magneto-optical effect (magneto-optical material), a thermo-optical and/or voltage-optical effect (thermo-optical material and voltage-optical material, respectively). Alternatively or additionally, multi-quantum-well structures which are generated by GaAs/AlGaAs semiconductors, for example, can be used. This means that other mechanisms for varying the refraction index can be used in the MMI. Although the following embodiments relate to an arrangement of electrodes configured to apply an electrical field to the electro-optical material, in accordance with other embodiments, a different material can be used, wherein, in these embodiments, other physical quantities are applied to the material in order to influence the refraction index, like a magnetic field, an electrical voltage or a temperature, for example, which can be done by means of electrodes or other producers of the physical quantity which are to be arranged in the respective cases.

Electro-optical materials may comprise different refraction indices $n_1$ and/or $n_2$ based on spatially varying electrical fields, thereby allowing a locally varying influence of light guided through the light path 16, thereby allowing light to propagate in different or varying modes. Similarly, magneto-optical materials may comprise the different refraction indices $n_1$ and/or $n_2$ based on spatially varying electrical fields, voltage-optical materials based on spatially varying voltages or thermos-optical materials based on spatially varying temperatures. The modes formed may comprise or provide a phase distribution, amplitude distribution or intensity distribution in the influenced light on the output side 22, which is different compared to the input side 18.

The device 10 comprises receiving means 26 configured to receive the influenced light on the output side 22. Exemplarily, receiving means 26 may comprise photodetectors or the like. Alternatively, other light-sensitive elements or materials can be used, like resistor elements which react to incident light with different resistance values.

In addition, the device 10 comprises evaluating means 28 configured to perform an evaluation based on the influenced light and generate the key 12 based on the evaluation. Exemplarily, the evaluating means 28 can be configured to evaluate a pattern of the light at the output side 22 based on the information obtained from the receiving means 26, for example as regards phase distribution, amplitude distribution and/or intensity distribution. This pattern can be transferrable to the key 12 based on a predefined criterion. In accordance with an embodiment, the receiving means 26 may comprise a one-dimensional or two-dimensional array of photodetectors. The evaluating means 28 may perform, for each of the photodetectors, a threshold value decision as to whether the quantity detected in the respective photodetector, like an intensity, is to be transferred to a binary 0 or a binary 1. A bit sequence can be obtained as the key 12 by lining up the individual decisions.

Alternatively, other types of deriving a bit sequence are possible in order to obtain the key 12. In addition to deriving a bit from a threshold value decision, it is also possible to further process such a bit sequence obtained, like by inverting, combination with other bits or quantities or the like.

FIG. 2a shows a schematic top view of a device 20 in accordance with an embodiment, which may have a similar setup to the device 10. The device 20 comprises the multimode interferometer 14. When compared to the device 10, the device 20 comprises a light source 32 which is connected to a light guide 34 configured to provide light provided by the light source 32 to the input side 18. Alternatively, the light source 32 may also be connected directly to the input side 18 so that placing the light guide 34 is optional. The light guide 34 may, for example, be an optical waveguide or optical fiber or the like. The light source 32 may be any light source. However, it may be of advantage for the detection and/or evaluation to be performed by the receiving means 26 or evaluating means 28 based on narrow-band light. A wavelength range $\Delta\lambda$ of at most 10 nm, advantageously at most 1 nm and particularly advantageously in a range of values of 1 to 10 pm may, for example, be considered to be narrow-banded. This may be done while considering that interferences in the multimode interferometer or light path are generated in dependence on the wavelength so that it may be of advantage for an interference between individual modes to use narrow-band light. A design criterion may consequently be for a coherence length of the light path to be implemented such that interferences at the output side 22 are obtained with good contrast so that an evaluation containing as few errors as possible can be performed.

A narrow-band light source, like a narrow-band light-emitting diode (LED) or laser, can be used for obtaining narrow-band light. Alternatively or additionally, the light source 32 may also comprise a filter configured to filter broad-band light of a light-generating element or light comprising at least higher a wavelength variation and to provide, at the output of the filter, the narrow-band light which can be guided to the multimode interferometer. Alternatively or additionally, it is also possible for the receiving means 26 to comprise such a filter configured to filter the influenced light and to filter out only a narrow-band signal from a potentially broad-band signal at the output side 22 in order to provide narrow-band filtered light at a filter output. The evaluating means 28 can be configured to perform the evaluation based on the narrow-band light.

The device 20 may comprise an electrode arrangement 36 configured to generate the locally varying refraction index based on locally varying electrical fields of the electrode arrangement 36. Here, the electrode arrangement 36 may comprise a plurality or multitude of electrodes $38_1$ to $38_{16}$. The electrodes $38_1$ to $38_{16}$ can be driven individually by driving means 42 of the device 20. The driving means 42 can be configured to drive an individual electrode $38_1$ to $38_{16}$ at one point in time, or any combination of at least two, at least three or a higher number of or even all electrodes $38_1$ to $38_{16}$. Here, the driving means 42 can apply an equal voltage but also mutually different electrical voltages to the electrodes $38_1$ to $38_{16}$, so that, while considering or neglecting an electrode distance of the electrodes $38_1$ to $38_{16}$ to a respective or common reference electrode, an equal field, but also mutually differing electrical fields, can be generated in the electro-optical material of the light path of the multimode interferometer.

Although the device 20 is illustrated such that the electrode arrangement 36 comprises 16 electrodes, any other number of electrodes can be used, like at least one, at least two, at least five, at least ten, at least 16, at least 64, at least 256 or a higher number of electrodes.

The electrodes $38_1$ to $38_{16}$ can be arranged to be spatially separate from one another, which means electrically insulated from one another. Individually driving the electrodes $38_1$ to $38_{16}$ allows spatially separately influencing the refraction index of the electro-optical material of the multimode interferometer, like at the respective position of the electrodes $38_1$ to $38_{16}$. Influencing here may relate to the presence of an electrical field, the intensity thereof and/or quality when compared to a situation when there is no electrical field, i.e. when the respective electrode $38_1$ to $38_{16}$ is not driven. Alternatively, influencing can be achieved by obtaining a different field strength, like changing a voltage value at the electrode $38_1$ to $38_{16}$ from a first value unequal to 0 to a second value unequal to 0. Alternatively or additionally, influencing may also be achieved by the absence of the electrical field, which means that the reference state may refer to the presence of the electrical field.

The driving means 42 can be configured to drive the electrodes $38_1$ to $38_{16}$ of the electrode means 36 such that a respective pattern in the influenced light and/or the key 12 is unambiguously associated to each pattern of driven electrodes. Exemplarily, an input signal 44 of the driving means 42 may comprise a piece of information or bit sequence which indicates unambiguously which of the electrodes $38_1$ to $38_{16}$ are to be driven and/or driven to what extent. If, for example, the driving means 42 is configured to drive a number of 16 electrodes $38_1$ to $38_{16}$ in a binary way, this means changing between a first voltage value and a voltage value, like on/off, so that the input signal 44 may comprise a corresponding number of bits, like 16. Each of the bits of the input signal 44 may thus be associated unambiguously to an electrode $38_1$ to $38_{16}$ and/or a combination of at least two of the electrodes $38_1$ to $38_{16}$, and indicate whether and how these electrodes are driven. Based on obtaining an unambiguous pattern at the output side 22 based on each of the patterns of driving the electrodes $38_1$ to $38_{16}$, an unambiguous key 12 can be obtained, which exemplarily comprises an equal bit length as the input signal 44. This means that a key 12 can be associated to each of the patterns on the output side 22. A key 12 can exemplarily be associated to each input signal 44 and/or an input signal can be associated to each key. By introducing redundancies, codes or the like, a smaller number of bits can be obtained.

An asymmetry in the electrode arrangement 36 can be of advantage for an unambiguous association of each key 12 to an input signal 44 or pattern of driven electrodes $38_1$ to $38_{16}$. When, for example, considering exclusively the electrode $38_{16}$ in a theoretical experiment, an influence of the light obtained by driving it can be identical or at least almost identical, irrespective of where the electrode 16 is along an x direction adjacent to the light path of the multimode interferometer 14. A position along the y direction, in contrast, may be of relevance and a changed position y of the electrode $38_{16}$ along the y direction may result in a changed influence. However, the influence may be symmetrical relative to a position where the light of the light source is guided into the multimode interferometer 14, light a central axis. Based on such symmetry, an arrangement at a maximum y value and an arrangement at a minimum y value of the electrode $38_{16}$ may result in an identical or almost identical influence on the output side 22. An asymmetry of the electrode arrangement 36 along the directions x and/or y may thus offer advantages with regard to an unambiguity of the pattern obtained at the output side 22.

The electrodes $38_1$ to $38_{16}$ can be arranged in a two-dimensional array and be formed to be asymmetrical with regard to at least one direction within the two-dimensional array.

The electrode arrangement 36 in accordance with FIG. 2a shows a particular advantageous embodiment where the electrodes $38_1$ to $38_{16}$ are formed to be asymmetrical along both directions x and y of the two-dimensional array. The electrodes $38_1$ to $38_{16}$ can be arranged in rows and columns, wherein a row may exemplarily comprise the electrodes $38_4$, $38_3$, $38_2$ and $38_1$; $38_5$, $38_7$, $38_6$ and $38_5$; $38_{12}$, $38_{11}$, $38_{10}$ and $38_9$ and $38_{16}$, $38_{15}$, $38_{14}$ and $38_{13}$. A column may exemplarily comprise the electrodes $38_4$, $38_5$, $38_{12}$ and $38_{16}$; $38_3$, $38_7$, $38_{11}$ and $38_{15}$; $38_2$, $38_6$, $38_{10}$ and $38_{14}$ and $38_1$, $38_5$, $38_9$ and $38_{13}$.

Electrodes within a column can be arranged along a column direction, like y. Electrodes within a row can be arranged along a row direction, like x. It is to be understood that any other association to the directions can be obtained by any other designation of the directions in space and/or by rotating the device 20 in space.

Electrodes within a row may comprise a mutually differing dimension along the row direction x. Here, the dimension of the respective electrode along the row direction x can be unambiguous. Unambiguous here may refer to the fact that each electrode is implemented individually with regard to its dimension and exemplarily comprises a dimension $x_1$, $x_2$, $x_3$ or $x_4$ which are mutually different. Unambiguity, however, may also refer to the fact that the respective dimension $x_1$ to $x_4$ cannot be obtained by a combination of other electrodes within the respective row. Influencing the light in the light path may be dependent on a spatial extension of the defect generated by the electrical field, i.e. the varying refraction index. By means of such unambiguity, namely that a dimension $x_1$ to $x_4$ cannot be obtained by a combination of respective other values $x_1$, $x_2$, $x_3$ and/or $x_4$, it can be avoided that a similar defect is obtained in the same row.

Alternatively or additionally, a dimension of electrodes within a column may comprise a mutually different dimension which is unambiguous within the column along the column direction y.

In accordance with a non-limiting embodiment, the following can apply:

$x_1 < x_2 < x_3 < x_4$; and $y_1 < y_2 < y_3 < y_4$.

When comparing a dimension along the respective row direction x or column direction y of two adjacent electrodes, for example when computing a quotient, wherein the greater dimension is in the numerator and the smaller dimension is in the denominator, like $y_4/y_3$ for the electrode pair $38_{16}$; $38_{12}$ or $x_3/x_2$ for the electrode pair $38_{15}$; $38_{14}$, a quotient comprising a quotient value can be calculated. In accordance with an embodiment, the following can, for example, apply: $x_4 = 2*x_3$, $x_3 = 2*x_2$ and $x_2 = 2*x_1$ and $y_4 = 2*y_3$, $y_3 = 2*y_2$ and $y_2 = 2*y_1$. Here, a quotient value of 2 can be obtained, for example, which is constant within each column and each row. This means that the quotient of the dimension of any two adjacent electrodes along the row direction and/or column direction can comprise a uniform quotient value. The quotient value can, for example, by a value within a range of values of at least 1.5 and at most 10, at least 2 and at most 8 and/or at least 2 and at most 3, like 2, for example. For quotients having a value between 1 and 2, there may be values for which the sum of two electrode lengths corresponds to the length of a third electrode, which can be avoided with regard to unambiguity. For values greater than or equaling 2, the length of a third electrode can no longer be obtained by the sum of the lengths of other electrodes, so that values of at least 2 for the quotient are of advantage.

Although the electrode arrangement 36 is described such that the electrodes or the array are formed to be asymmetrical relative to both directions x and y, asymmetry with regard to one direction may be sufficient. Although the array of the electrode arrangement 36 is described such that the quotient is constant within a row and a column, in accordance with other embodiments, an array may be implemented such that electrodes within one row may comprise a mutually different dimension, unambiguous within the row, along the row direction x. Alternatively or additionally, the electrodes within one column may comprise a mutually different dimension, unambiguous within a column, along the column direction y. Alternatively, there may be a symmetrical arrangement or implementation of potentially identically implemented electrodes or the quantity influencing the refraction index.

In a generalized form, the electrode means 38 may be implemented with regard to the two-dimensional array such that the electrodes $38_1$ to $38_{16}$ are formed to be asymmetrical with regard to at least one direction x or y of the two-dimensional array, with regard to the influence of the light guided by the light path. This may be implemented such that each electrode $38_1$ to $38_{16}$ causes an unambiguous influence of the light at the output side 22. The asymmetrical influence of the light guided through the light path, with regard to at least one direction x or y of the two-dimensional array, can be generated by mutually different electrode geometries and/or by mutually different electrical voltages at the electrodes $38_1$ to $38_{16}$.

A reference electrode for the electrodes $38_1$ to $38_{16}$ is not illustrated in FIG. 2a.

Figure 2B:
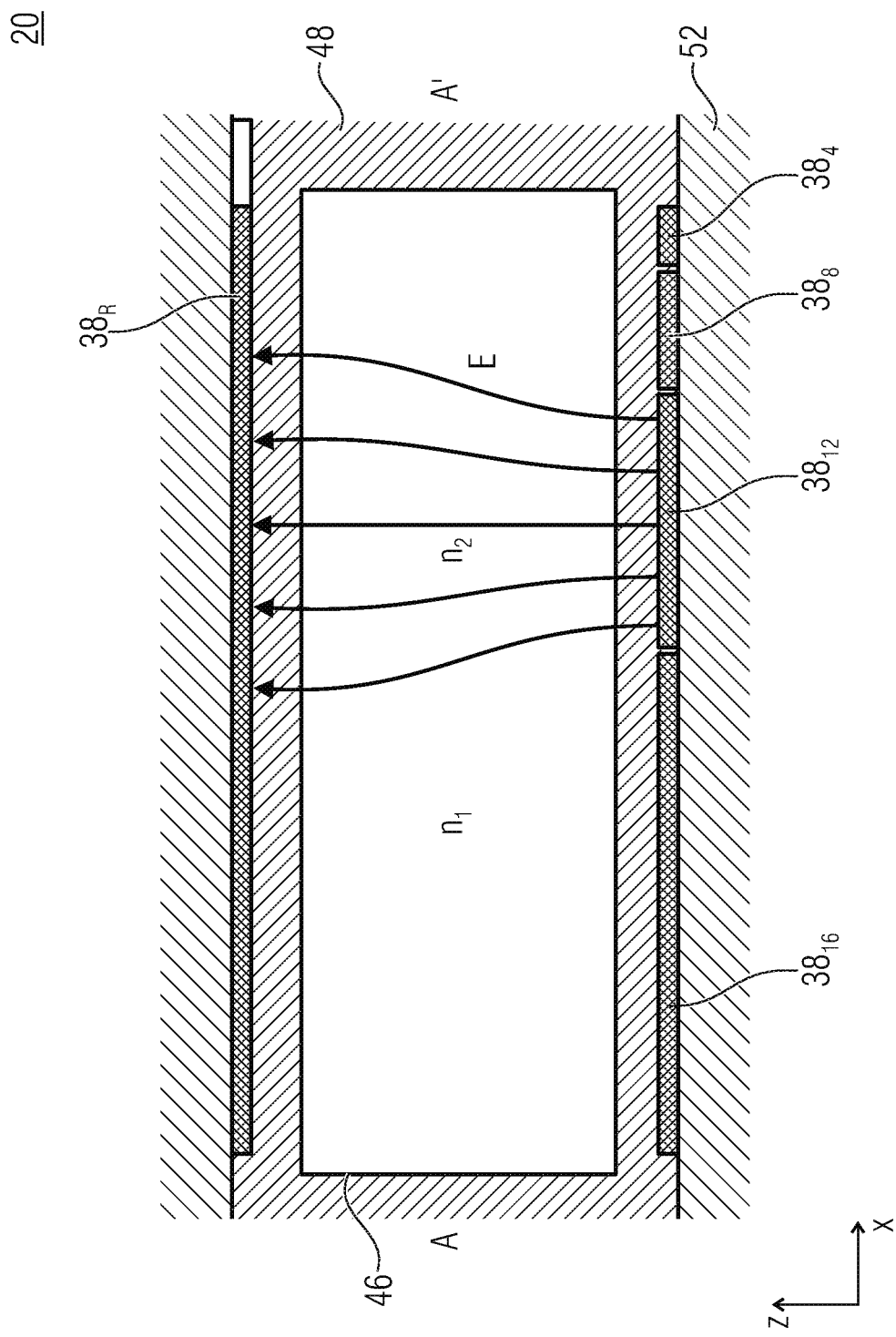

FIG. 2b shows a schematic sectional side view of the device 20 along a section A-A' of a sectional line illustrated correspondingly in FIG. 2a. A reference electrode $38_R$ can be arranged to be opposite the electrodes $38_4$, $38_8$, $38_{12}$ and $38_{16}$ within the sectional line A-A' so that the electro-optical material 46 of the multimode interferometer is arranged between the electrodes $38_4$, $38_8$, $38_{12}$ and $38_{16}$ or more or even all of the electrodes of the electrode arrangement 36 and the reference electrode $38_R$. The reference electrode $38_R$ may be an individual electrode which is opposite the total electrode arrangement 36, but may also be implemented in the form of several electrodes. In the illustration of FIG. 2b, an electrical voltage may, for example, be applied to the electrode $38_{12}$, like by driving by means of the driving means 42. In the region of an electrical field E obtained in this way, a refraction index of the electro-optical material 46 may be altered and exemplarily be $n_2$, whereas a refraction index $n_1$ may be present outside the electrical field. The electro-optical material 46 may be enclosed by a cladding 48 which can reduce or prevent light from exiting the electro-optical material 46, or allow electrical insulation of the electrodes of the electrode array 36 relative to the reference electrode $38_R$. The device 20 can comprise a substrate 52 which supports the device 20 at least partly.

The output side 22 may comprise a similar geometry to the cross-sectional area of the electro-optical material 46 shown, wherein a different cross-sectional area can be obtained by changing the geometry of the electro-optical material 46 along the light path. Along such an area, the evaluating means 28 can be configured to determine a local intensity distribution of the influenced light or the filtered light and to generate the key 12 based on the local intensity distribution.

In other words, a suggested cryptographic multimode interferometer (crypto MMI) transfers an electrical n-bit input signal into an electrical m-bit output signal, wherein n≥m can apply and, thus, n=m, like n, m=16. At first, each bit of the n-bit input signal is, for example, converted, by means of the driving electronics, to a voltage value corresponding to the respective bit value, by means of which an electrode associated to the respective bit is driven.

As can be seen from FIG. 2b which shows a section through the MMI, the refraction index of the electro-optical core material changes due to the electrical field E between the electrodes and a counter electrode so that the result in the MMI is a refraction index distribution which results from the entirety of the electrode distribution driven. The refraction index distribution within the MMI, similarly to a hologram, when being passed, influences the phase of the light incident in the MMI from a laser (light source) so that the result for each digital input signal is a characteristic intensity distribution at the output of the MMI. This intensity distribution at the output of the MMI is detected by a device for detecting (receiving means) and transferred to an n-bit output signal by means of evaluating electronics (evaluating means). Such an MMI exhibits a characteristic suitable for encryption. Thus, when suitably selecting the electrode shape and arrangement, transferring the input signal to the output signal is unambiguous. This may be achieved by an asymmetrical arrangement of the electrodes. The transfer function can consequently not be extrapolated by means of statistical methods. Furthermore, computing models of the crypto MMI are too imprecise and/or too complicated as far as calculation is concerned, for mapping its behavior.

FIG. 2c shows a schematic sectional side view of a device 20' modified when compared to the device 20 along the sectional line A-A'. The device 20' is modified in that the electrodes $38_i$ and at least one counter electrode are arranged on the same side of the material 46. As is the case in the device 20, a common counter electrode $38_R$ is provided, for example. Alternatively, several common or individually controllable counter electrodes $38_{Ri}$ are provided. In accordance with an embodiment, one counter electrode $38_{Ri}$ each is associated to an electrode $38_i$ so that there are corresponding numbers of drive electrodes 38 and counter electrodes $38_R$. In this way, one bit of the key can be represented each as a pair of an electrode $38_i$ and a counter electrode $38_{Ri}$ and be formed by driving the pair.

FIG. 3 shows a schematic illustration of the output side 22 which is subdivided into mutually different sub-regions $54_1$ to $54_{16}$. The output side 22 can be a cross-sectional area of the light path which is evaluated with regard to the locally varying influence. The evaluating means of the device, like the evaluating means 28, can be configured to perform a local influence, like the local intensity distribution, in mutually different sub-regions $54_1$ to $54_{16}$ of a total region of the light path, i.e. the output area 22. The key generated may comprise a plurality of key portions. Each key portion can comprise at least one bit but also a higher number of bits. The key 12 exemplarily comprises a number of 16 bits $B_1$ to $B_{16}$. Each key portion $B_1$ to $B_{17}$ can be associated to a sub-region $54_1$ to $54_{16}$, which means that, based on the local evaluation of each sub-region $54_1$ to $54_{16}$, at least one bit of information can be derived for the key 12. If a binary threshold value decision is, for example, performed for each sub-region $54_1$ to $54_{16}$, one bit of information can be gained for each sub-region $54_1$ to $54_{16}$. If there is a multi-stage threshold value decision, a higher number of bits can be arranged per sub-region.

Although the output side 22 is represented as a rectangle, it may comprise any other shape, like a round, elliptical, polygonal shape, a free-form area or combination thereof. Each of the sub-regions $54_1$ to $54_{16}$ may be formed to be round, angular, polygonal, elliptical or a free-form area and may comprise a same dimension or dimension differing from other sub-regions. In particular, a position and type and shape of the sub-regions $54_1$ to $54_{16}$ can be adjusted to the light pattern obtained.

Although the sub-regions $54_1$ to $54_{16}$ are illustrated such that they form a single-line array at the output side 22, any arrangement can be selected, like a two-line or multi-line array or any other geometrical arrangement which matches the effects to be detected at the output side 22.

As is discussed in connection with FIGS. 2a and 2b, the multimode interferometer can be configured to vary the refraction index of the electro-optical material in a locally varying manner based on a bit sequence in the input signal 44. The input signal 44 may comprise a first number of bits, like 16. The evaluating means can be configured to provide, for the key 12, a bit sequence having a corresponding number of bits for the key 12.

FIG. 4 shows a schematic block diagram of a device 40 in accordance with an embodiment, which communicates with another device 57. The device 40 can be of a similar setup to the device 20 and can comprise a physical or logical signal input 56. At the signal input 56, the device 40 can receive a bit sequence which exemplarily comprises the input signal 44, in a wireless or wired manner. The device 40 can comprise a logical or physical signal output 58 and be configured to transmit the key 12 using the signal output 58. The signal input 56 and the signal output 58 may be parts of separate or a common communication interface. The device 57 can be configured to transmit the input signal 44 to the device 40. Based thereon, the device 40 can form the key 12 and transmit same back to the device 57. Based thereon, the device 57 can check whether the device 40 knows the shared secret in order to generate the matching key 12 based on the input information of the input signal 44. Instead of the key 12, the device 40 can also be configured to transmit a message encoded or decoded using the key 12 to the device 47. In this case, the encrypted or unencrypted message can be the shared secret.

Alternatively or additionally, the device 40 can be configured to transmit the input signal 44 with the signal output 58 and receive the key 12 responsive thereto. The device 40 can thus be configured to provide the bit sequence of the input signal 44 at the signal output 58 and can receive, at the signal input 56, an input signal which comprises a reference key, i.e. the key 12. In this case, the device 40 can be configured to compare the reference key to the self-generated key and to evaluate an identity of the device 57 based on a result of the comparison.

Again making reference to FIGS. 2a and 2b, the device 20 can be configured to guide first light and second light, differing from the first one, through the light path in temporally differing time intervals. The mutually differing light settings may, for example, be mutually different wavelengths. Based on each of the mutually different wavelengths, a mutually differing interference pattern can be obtained at the output side 22 of the light path so that different keys can be provided by the evaluating means 28 based on different wavelengths. The evaluating means can be configured to combine the keys obtained in this way to form a total key, like by joining or connecting the individual bits to one another.

Figure 5A:
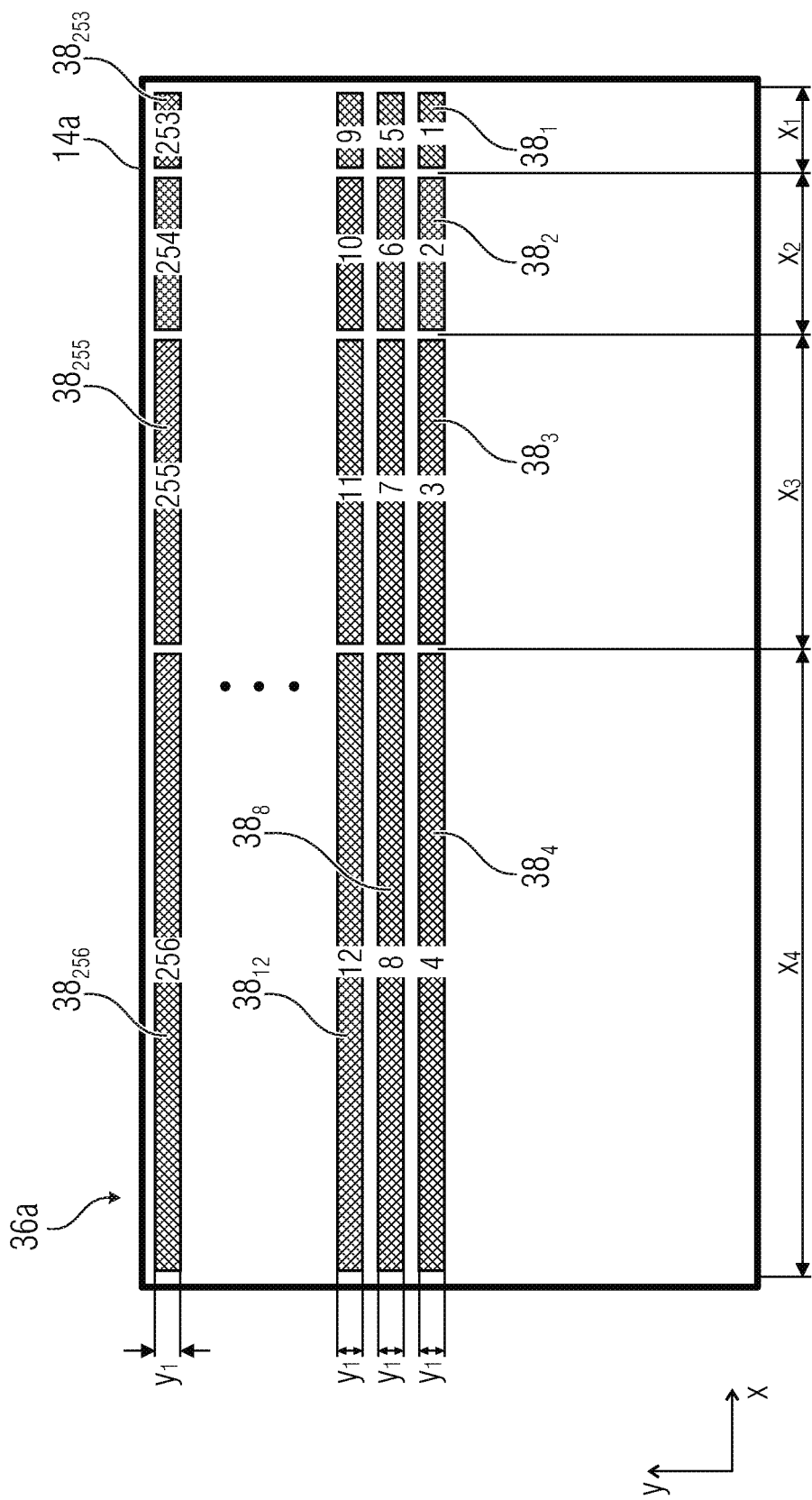

FIG. 5a shows a schematic top view of an electrode arrangement 36a of a multimode interferometer 14a which can be used in inventive devices. The electrode arrangement 36a comprises a number of at least 256 electrodes, arranged in four columns, wherein the dimensions of the electrodes within the respective column are equal and can, depending on the column, be $x_1$, $x_2$, $x_3$ or $x_4$. A number of 256 electrodes may, for example, be driven by means of a signal comprising at least 256 bits. A different number of electrodes can be used with no limitation caused, like more than 10, more than 50, more than 100 or more than 256. The electrodes of a row, like the electrodes $38_1$, $38_2$, $38_3$ and $38_4$, can comprise different dimensions in the x direction and equal dimensions along the y direction. Additionally, the electrodes within one column, like electrodes $38_4$, $38_8$, $38_{12}$, . . . , $38_{256}$, can comprise an equal dimension along the y direction, like the dimension $y_1$. This means that, compared to FIG. 2a, the asymmetry may be present also in only one direction x or y. Optionally, the electrodes $38_4$, $38_8$, $38_{12}$, . . . , $38_{256}$ may comprise the same width, but, with reference to the MMI, be nevertheless arranged to be asymmetrical, like by an offset or a different dimension in $y_1$ or the like.

FIG. 5b shows a schematic top view of an electrode arrangement 36b of a multimode interferometer 14v which can be used in devices in accordance with embodiments described herein. The electrodes $38_1$ to $38_{16}$ are asymmetrical with regard to their surface geometry and each comprise a free-form surface. Electrode lengths (dimension along the x direction) and electrode widths (dimension along the y direction) may vary individually within the electrode and result in an individual surface geometry of the respective electrode $38_1$ to $38_{16}$.

Figure 5C:
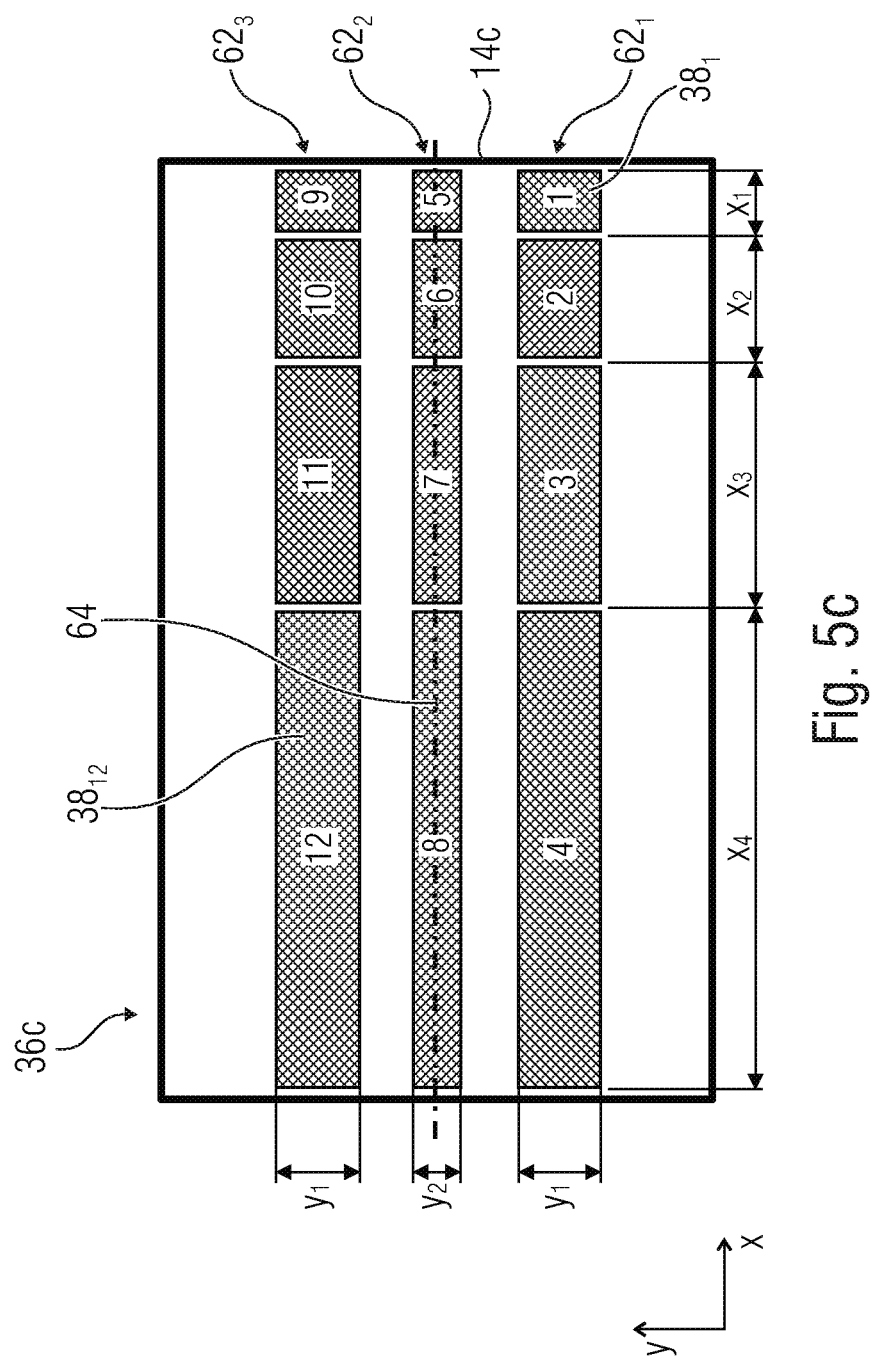

FIG. 5c shows a schematic top view of an electrode arrangement 36c of a multimode interferometer 14c which can be used in devices in accordance with embodiments described herein. The electrode arrangement 36c comprises electrodes $38_1$ to $38_{12}$ symmetrical with respect to the geometry used. The electrodes $38_1$ to $38_{12}$ can be arranged in a number of rows $62_1$ to $62_3$, like three rows. The rows $62_1$ to $62_3$ can be arranged symmetrical relative to an axial symmetry axis 64, which may describe, for example, a center light propagation path of the light path 16. Thus, the rows $62_1$ and $62_3$ can be arranged off the symmetry axis 64 but comprise an identical dimension $y_1$ relative to the electrode widths, i.e. extension along the y direction. In addition, rows $62_1$ and $62_3$ can be arranged with the same distance to the symmetry axis 64 on both sides thereof. Row $62_2$ may, for example, be arranged on and, consequently, in symmetry to the symmetry axis 64 and comprise an equal dimension along the y direction or a respective deviating dimension $y_2$. The driving means 42 can be configured to apply mutually different electrical voltages to the rows $62_1$ and $62_3$, for example, to obtain an asymmetry in this way. This means that the electrodes $38_1$ to $38_{12}$ can also be formed to be geometrically symmetrical and an asymmetry can be obtained by asymmetrically driving the electrodes.

FIG. 5d shows a schematic top view of an electrode arrangement 36d of a multimode interferometer 14d which can be used in devices in accordance with embodiments.

The electrodes $38_1$ to $38_{256}$ can be arranged in a two-dimensional array having rows and columns, wherein all the electrodes can comprise an equal dimension along the x direction, i.e. $x_1$, and along the y direction, i.e. $y_1$. An asymmetry can be obtained by electrically mutually differently driving the electrodes $38_1$ to $38_{256}$. Alternatively or additionally, an asymmetry can be obtained by arranging the electrodes asymmetrically relative to the symmetry axis 64. It may be sufficient to provide only the electrodes in differing columns $66_1$ to $66_4$ with mutually different electrical potentials.

Further electrodes can be arranged, like symmetrically relative to the electrodes $38_1$ to $38_{256}$ illustrated and relative to the symmetry axis 64. In this case, it may also be of advantage to provide the then symmetrically additionally arranged electrodes with different electrical potentials, in particular relative to an electrode, symmetrical thereto, within the same column $66_1$ to $66_4$.

In other words, electrodes can be provided with different voltages, in correspondence with their rows, so as to break the symmetry, in case of FIG. 5c, and obtain an asymmetry. In the case of FIG. 5d, electrodes can be provided with different, for example increasing, electrical voltages, in correspondence with their column, which can generate a similar or equal effect as is generated by continuously longer electrodes along the negative x direction in FIG. 2a.

Figure 6:
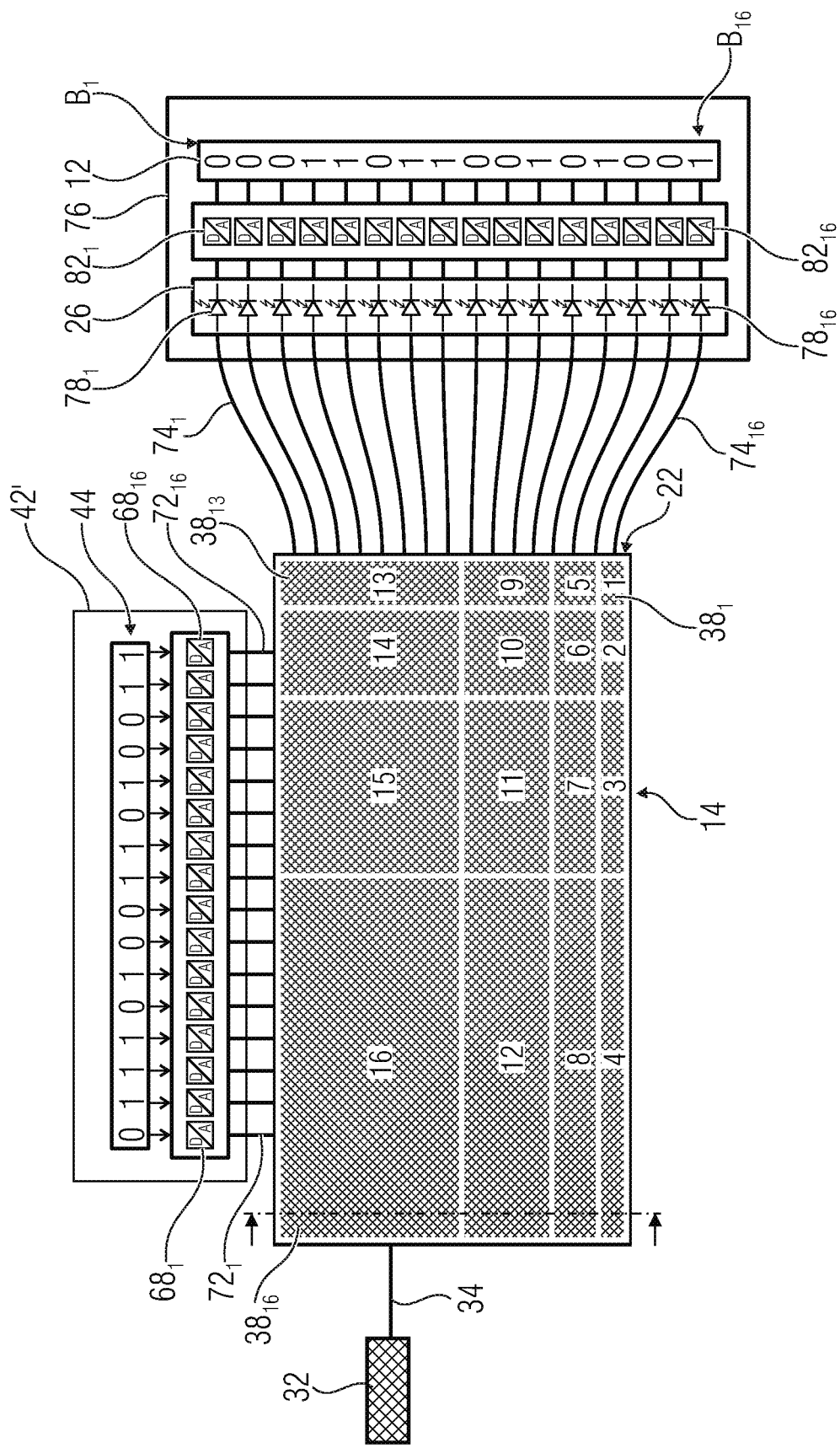
FIG. 6 is a schematic top view of a device in accordance with an embodiment, comprising driving means and an evaluation unit.

FIG. 6 shows a schematic top view of a device 60 in accordance with an embodiment, which can be similar in setup to the device 20. The device 60 can comprise driving means 42' configured to drive a corresponding number of digital-to-analog converters $68_1$ to $68_{16}$, the analog output signals $72_1$ to $72_{16}$ of which are used for driving the electrodes $38_1$ to $38_{16}$, based on the input signal 44 having a number of 16 Bits, for example. Waveguides $74_1$ to $74_{16}$ can be connected to the multimode interferometer 14 at the output side 22, and configured to couple out a respective light signal from the output side 22. Exemplarily, one of the waveguides $74_1$ to $74_{16}$ each can be connected to a sub-region $54_1$ to $54_{16}$ in accordance with FIG. 3. Calculating means 76 of the device 60 can comprise the receiving means 26 which may, for example, comprise an array of photodetectors $78_1$ to $78_{16}$ to receive one of the signals of the waveguides $74_1$ to $74_{16}$ each. Alternatively, a smaller number of photodetectors may be arranged and these may, for example, be used in time-multiplex.

The calculating means 76 may comprise a number of analog-to-digital converters $82_1$ to $82_{16}$ of which one each can be coupled to a photodetector $78_1$ to $78_{16}$, wherein multiplexing concepts may be used here, too. Based on converting the light signal of an individual waveguide $74_1$ to $74_{16}$ or a subrange, a respective Bit $B_1$ to $B_{16}$ of the key 12 can be obtained.

Forming the bits $B_1$ to $B_{16}$ can take place in the calculating means which can assemble the bit values.

Figure 7:
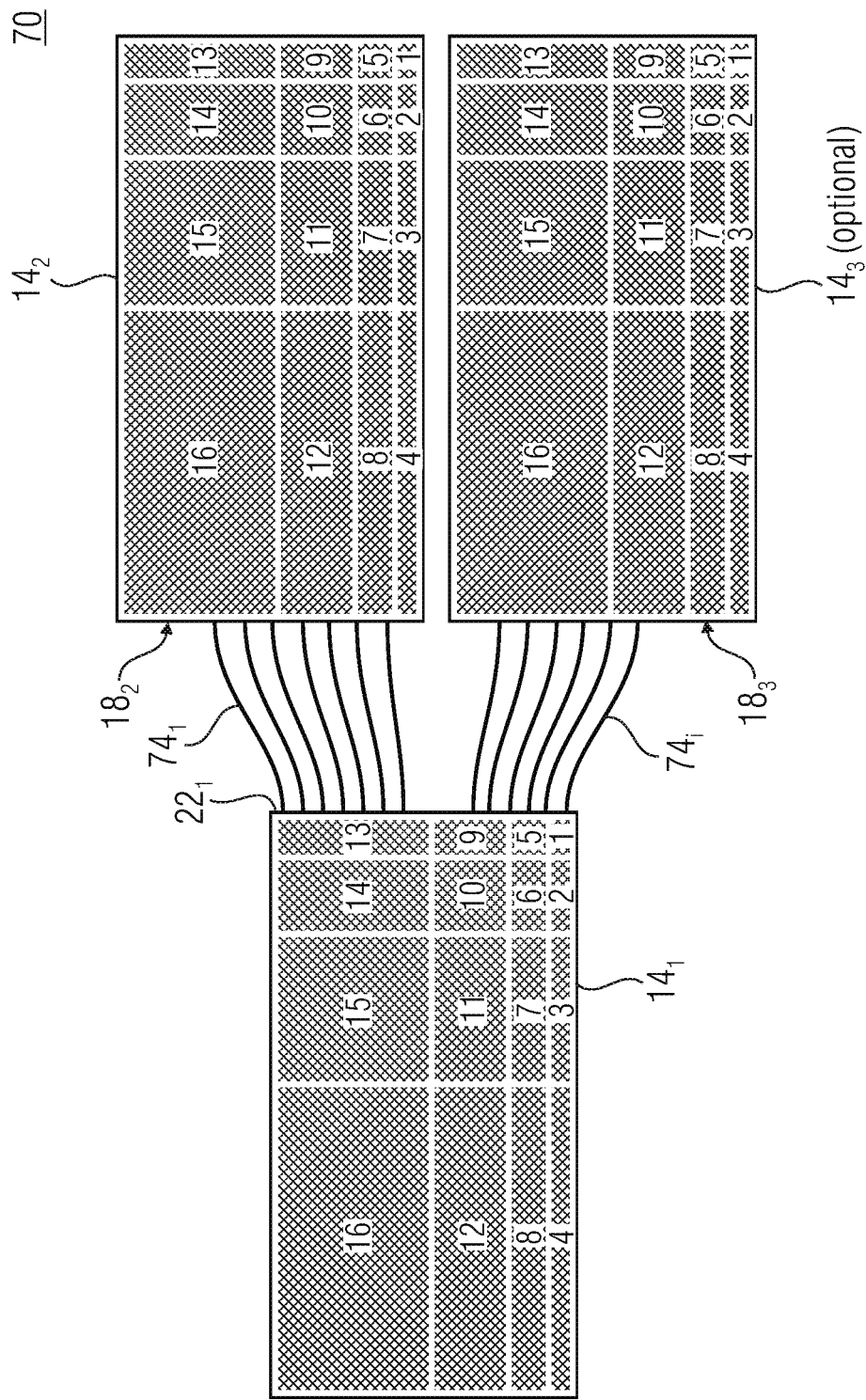
FIG. 7 is a schematic top view of a device in accordance with an embodiment, comprising at least a first multimode interferometer and a second multimode interferometer arranged in series.

FIG. 7 shows a schematic top view of a device 70 in accordance with an embodiment, comprising at least a first multimode interferometer $14_1$ and a second multimode interferometer $14_2$, which may each be formed to be equal or mutually different, and which may each be formed in accordance with the discussions in the context of the multimode interferometer 14, 14a, 14b, 14c and/or 14d, for example. At its input side $18_2$, the multimode interferometer $14_2$ is coupled to an output side $22_1$ of the multimode interferometer $14_1$, wherein the multimode interferometer $14_2$ can obtain the interference patterns at the output side $22_1$ either partly or completely. The connection between the output side $22_1$ and the input side $18_2$ may be via the waveguide 74. This means that the multimode interferometer $14_2$ can obtain already influenced light as an input signal and continue to influence this light. One or several further multimode interferometers $14_3$ can be provided optionally and be arranged in parallel to the multimode interferometer $14_2$.

Exemplarily, the multimode interferometer $14_3$ can obtain a different portion of the local intensity distribution than the multimode interferometer $14_2$, like based on mutually different sub-regions 58 in accordance with FIG. 3. The third multimode interferometer $14_3$ which can be coupled to the output of the light path 16 in parallel to the second multimode interferometer $14_2$ can thus be configured to obtain a local intensity distribution of the light path differing from the second multimode interferometer $14_2$. This means that different sub-regions of the output side $22_1$ can be coupled to different input sides $18_2$ or $18_3$ of different multimode interferometers. In other words, FIG. 7 shows cascading of multimode interferometers.

Figure 8:
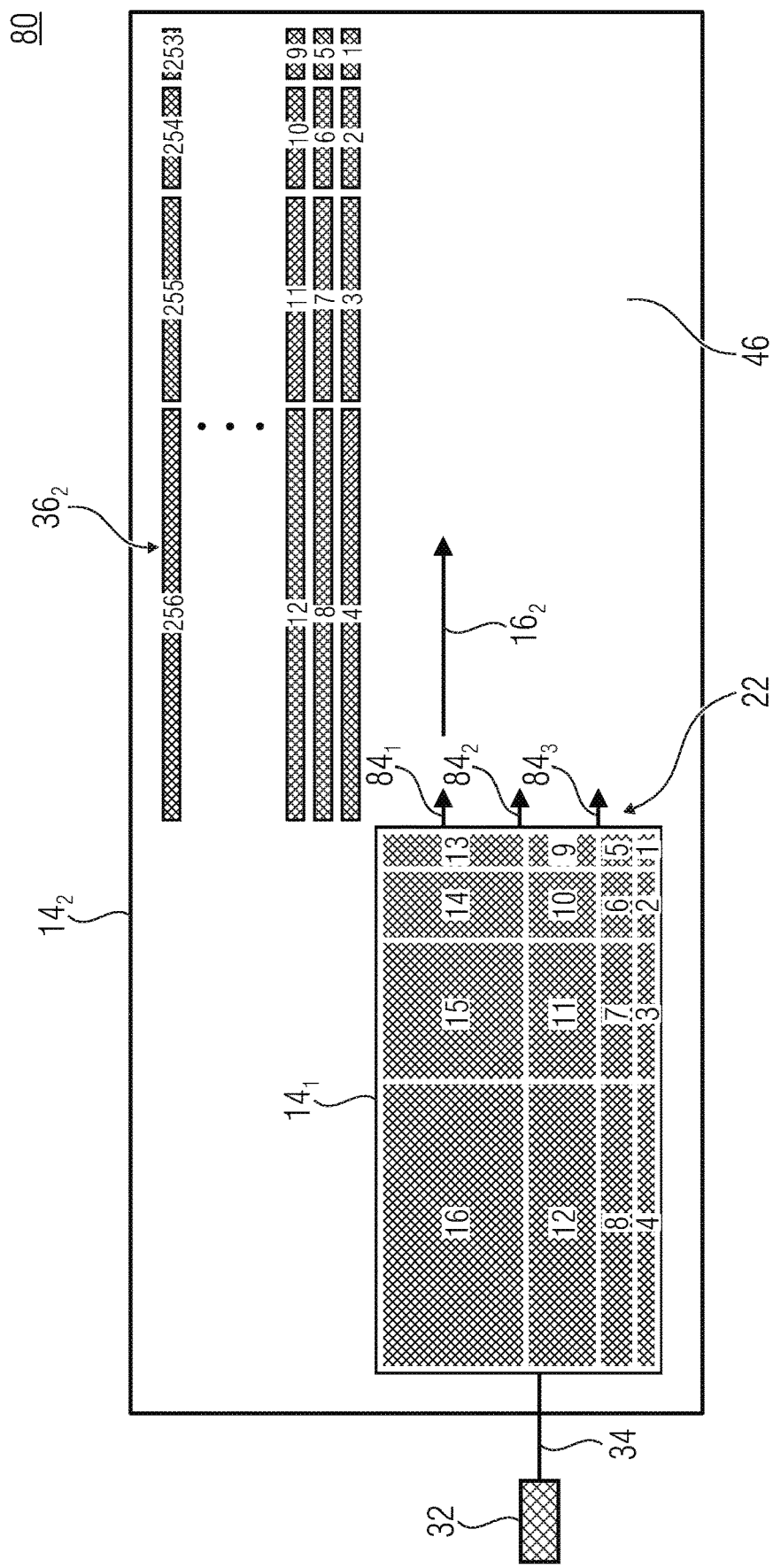
FIG. 8 is a schematic top view of a device in accordance with an embodiment, where a multimode interferometer is arranged to be interleaved in a further multimode interferometer.

FIG. 8 shows a schematic top view of a device 80 in accordance with an embodiment where the multimode interferometer $14_1$ is arranged to be interleaved in another multimode interferometer $14_2$. The multimode interferometer $14_1$ can be implemented such that the light path comprises two or more outputs $84_1$ to $84_3$. These may output different spatial intensity distributions of the light path based on mutually different sub-regions of the output side 22 and couple to an input of the multimode interferometer $14_2$ at different lateral positions or couple into the light path $16_2$ thereof. This means that different spatial intensity distributions of the inner multimode interferometer $14_2$ can be coupled in at laterally different positions of the light path $16_2$ of the outer multimode interferometer $14_2$. The light path $16_2$ can be driven by a special array or a special electrode arrangement $36_2$ in order to influence the sub-signals obtained from the outputs $84_1$ to $84_3$. The position of coupling the waveguide to the respective multimode interferometer can be varied and be in the center, but this is not necessarily the case.

The devices 70 and 80, i.e. the combination of several multimode interferometers, allows increasing a robustness of the keys since the potential influence and, thus, the calculating operations to be considered increase and reproducing or extrapolating the key is becoming correspondingly more complicated.

Although the serial connection or cascading of MMIs in FIG. 7 and the interleaving in FIG. 6 are described to be mutually separate implementations, the two may also be arranged in a combined manner, i.e. cascaded MMIs can be interleaved and/or interleaved MMIs be cascaded.

Apart from employing a multimode interferometer, embodiments also comprise multimode interferometers which can be connected to the light source, like a laser, with no waveguide being present. Additionally, embodiments also refer to crypto MMIs which comprise successively cascaded MMIs, see device 70, and/or interleaved MMIs, see device 80.

Embodiments refer to a cryptographic hardware key comprising electro-optically programmable multimode interferometers as the core component. The embodiments allow a component which is able to convert an electrical digital input signal to an electrical digital output signal in an unambiguous manner. Here, the method for converting, i.e. encrypting, the input signal may be based on physical effects, which is of advantage when compared to software- or hardware-based algorithms. The embodiments exhibit an electro-optically programmable multimode interferometer (MMI) as a core component of a cryptographic hardware key, which may also be referred to as crypto MMI.

Figure 9:
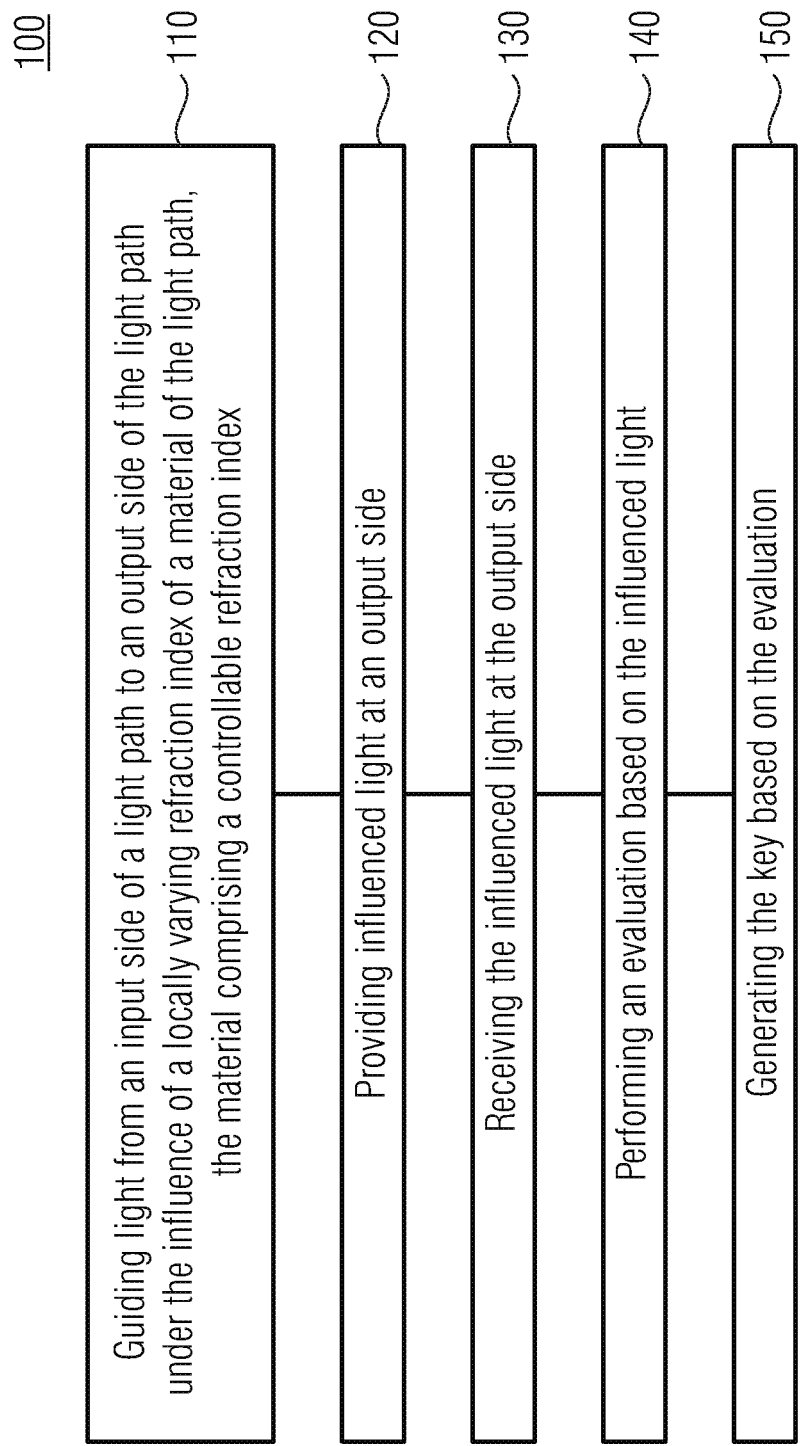
FIG. 9 is a schematic flow chart of a method in accordance with an embodiment.

FIG. 9 shows a schematic flow chart of a method 100 in accordance with an embodiment. Step 110 comprises guiding light from an input side of a light path to an output side of the light path under the influence of a locally varying refraction index of a material of the light path which comprises a controllable refraction index. This may comprise controlling the refraction index so that the material varies locally in its refraction index. Step 120 comprises providing influenced light at an output side of the light path. Step 130 comprises receiving the influenced light at the output side. Step 140 comprises performing an evaluation based on the influenced light. Step 150 comprises generating a key based on the evaluation.

Although embodiments described herein disclose an arrangement of 12, 16 or 256 electrodes and using a corresponding number of bits for driving, a different number of electrodes can be used and/or a number of bits differing from one bit can be used for driving an electrode.

Although some aspects were described in connection with a device, it is to be understood that these aspects also represent a description of the corresponding method so that a block or element of a device is to be understood to be also a corresponding method step or feature of a method step. In analogy, aspects described in connection with or as a method step also represent a description of a corresponding block or detail or feature of a corresponding device.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A device for generating a key, comprising:
a multimode interferometer which can be coupled to a light source and comprises a light path comprising a material comprising a controllable refraction index, the light path being configured to acquire light at an input side and influence the light under the influence of a locally varying refraction index of the material in order to provide influenced light at an output side;
a receiver configured to receive the influenced light that is influenced by the locally varying refraction index of the material at the output side; and
an evaluator configured to perform an evaluation based on the influenced light that is influenced by the locally varying refraction index of the material and to generate the key based on the evaluation;
an electrode arrangement configured to generate the locally varying refraction index based on locally varying electrical fields of the electrode arrangement;
wherein the receiver comprises an array of photodetectors and the evaluator is configured to perform, for each of the photodetectors, a threshold value decision as to whether a quantity detected in the respective photodetector is to be transferred to a binary 0 or a binary 1 and to acquire a bit sequence as the key by lining up the threshold value decisions.

2. The device in accordance with claim 1, configured to acquire a locally varying influence of the light based on the locally varying refraction index.

3. The device in accordance with claim 1, comprising a light source which is connected to the light path and configured to emit the light.

4. The device in accordance with claim 3, wherein the light source is a narrow-band light source.

5. The device in accordance with claim 3, wherein the light source comprises a laser or a filter.

6. The device in accordance with claim 1, wherein the receiver comprises a filter configured to filter the influenced light and to provide narrow-band filtered light at a filter output, the evaluator being configured to perform the evaluation based on the narrow-band filtered light.

7. The device in accordance with claim 1, wherein the evaluator is configured to determine a local intensity distribution of the influenced light or filtered light and to generate the key based on the local intensity distribution.

8. The device in accordance with claim 7, wherein the evaluator is configured to perform the local intensity distribution in mutually different sub-regions of a total region of the light path, wherein the key comprises a plurality of key portions, each key portion being associated to a sub-region.

9. The device in accordance with claim 1, wherein the electrode arrangement comprises a plurality of spatially separate electrode elements configured to influence the refraction index of the material in a spatially separate manner; the device comprising a driver configured to drive the electrode elements such that a pattern in the influenced light is associated unambiguously to each pattern of driven electrodes.

10. The device in accordance with claim 1, wherein the electrode arrangement comprises a plurality of spatially separate electrode elements arranged in a two-dimensional array, wherein the electrodes are formed to be asymmetrical relative to at least one direction of the two-dimensional array, with reference to influencing the light guided through the light path.

11. The device in accordance with claim 10, configured to generate an asymmetrical influence of the light guided through the light path relative to at least one direction of the two-dimensional array by means of mutually different electrode geometries and/or by mutually different electrical voltages at the electrode elements.

12. The device in accordance with claim 1, wherein the electrode arrangement comprises a plurality of spatially separate electrode elements which are arranged in rows and columns of a two-dimensional array;
wherein electrodes within one row comprise a mutually different dimension, unambiguous within the row, along a row direction; and/or
wherein electrodes within a column comprise a mutually different dimension, unambiguous within the column, along a column direction.

13. The device in accordance with claim 12, wherein a quotient of the dimension of any two neighboring electrodes along the row direction comprises a uniform quotient value; and/or
wherein a quotient of the dimension of any two electrodes along the column direction comprises the uniform quotient value.

14. The device in accordance with claim 13, wherein the quotient value comprises a value within a range of values of at least 1.5 and at most 10.

15. The device in accordance with claim 1, wherein the multimode interferometer is configured to vary the refraction index of the material in a locally varying manner based on a bit sequence comprising a first number of bits, wherein the evaluator is configured to provide, for the key, a bit sequence comprising the first number of bits for the key.

16. The device in accordance with claim 15, configured to provide the bit sequence at a signal output and to receive, at a signal input, an input signal which comprises a reference key, the device being configured to compare the reference key to the key and to evaluate an identity of a transmitter of the input signal based on a result of the comparison.

17. The device in accordance with claim 1, wherein the key is a first key, the device being configured to guide first light through the light path during a first time interval in order to acquire the first key, and to guide second light through the light path during a second time interval in order to acquire a second key, wherein the evaluator is configured to combine the first key and the second key to form a total key.

18. The device in accordance with claim 1, wherein the multimode interferometer is a first multimode interferometer, the device comprising at least a second multimode interferometer coupled to an output of the light path.

19. The device in accordance with claim 18, comprising at least a third multimode interferometer which is coupled to the output of the light path in parallel to the second multimode interferometer and configured to acquire a local intensity distribution of the light path which differs from the second multimode interferometer.

20. The device in accordance with claim 1, wherein the multimode interferometer is a first multimode interferometer which is arranged to be interleaved in a second multimode interferometer.

21. The device in accordance with claim 20, wherein the light path is a first light path and comprises at least two spatially spaced apart outputs of the light path which are configured to output different spatial intensity distributions of the light path and which are coupled to an input of the second light path of the second multimode interferometer at different lateral positions.

22. The device in accordance with claim 1, comprising an output interface configured to provide the key.

23. The device in accordance with claim 1, wherein the material comprises at least one of an electro-optical material, a magneto-optical material, a thermos-optical material and a voltage-optical material.

24. The device in accordance with claim 1, wherein the material is an electro-optical material and comprises at least one of beta barium borate, lithium niobate, lead lanthanium zirconate titanate and liquid crystals.

25. A method for generating a key, comprising:

guiding light from an input side of a light path to an output side of the light path under the influence of a locally varying refraction index of a material of the light path, the material comprising a controllable refraction index;

generating the locally varying refraction index by an electrode arrangement based on locally varying electrical fields of the electrode arrangement;

providing influenced light at the output side;

receiving the influenced light at the output side by a receiver which comprises an array of photodetectors;

performing an evaluation based on the influenced light by performing a threshold value decision, for each of the photodetectors, as to whether a quantity detected in the respective photodetector is to be transferred to a binary 0 or a binary 1; and generating the key based on the evaluation by lining up the threshold value decisions.

* * * * *